(12) United States Patent
Marcin et al.

(10) Patent No.: US 10,708,607 B1
(45) Date of Patent: Jul. 7, 2020

(54) MANAGING ENCODING BASED ON PERFORMANCE

(71) Applicant: Amazon Technologies, Inc., Seattle, WA (US)

(72) Inventors: Ivan Marcin, Palo Alto, CA (US); Martin Hess, Soquel, CA (US); Alex Converse, Oakland, CA (US); Matthew Louis Szatmary, Walnut Creek, CA (US)

(73) Assignee: Amazon Technologies, Inc., Seattle, WA (US)

(*) Notice: Subject to any disclaimer, the term of this patent is extended or adjusted under 35 U.S.C. 154(b) by 57 days.

(21) Appl. No.: 15/934,588

(22) Filed: Mar. 23, 2018

(51) Int. Cl.
*H04N 19/30* (2014.01)
*H04N 21/24* (2011.01)
*H04N 19/146* (2014.01)
*H04N 19/156* (2014.01)
*H04N 19/164* (2014.01)
*H04N 19/115* (2014.01)

(52) U.S. Cl.
CPC ........... *H04N 19/30* (2014.11); *H04N 19/115* (2014.11); *H04N 19/146* (2014.11); *H04N 19/156* (2014.11); *H04N 19/164* (2014.11); *H04N 21/2402* (2013.01)

(58) Field of Classification Search
CPC .................................................. H04N 19/164
See application file for complete search history.

(56) References Cited

U.S. PATENT DOCUMENTS

| | | | | |
|---|---|---|---|---|
| 6,535,238 B1* | 3/2003 | Kressin | ................. | H04N 7/141 348/14.01 |
| 2008/0263605 A1* | 10/2008 | Mine | .................. | H04N 7/17318 725/87 |
| 2010/0054329 A1* | 3/2010 | Bronstein | ............ | H04N 19/147 375/240.03 |
| 2012/0106669 A1* | 5/2012 | Rao | ...................... | H04N 19/172 375/295 |
| 2012/0230390 A1* | 9/2012 | Akkor | .............. | H04N 21/23655 375/240.02 |
| 2012/0284756 A1* | 11/2012 | Kotecha | .............. | H04L 65/4084 725/68 |
| 2015/0312572 A1* | 10/2015 | Owen | .................. | H04N 19/102 375/240.02 |
| 2016/0248474 A1* | 8/2016 | Gilson | ...................... | H04B 3/06 |
| 2018/0014010 A1* | 1/2018 | Dai | ....................... | H04N 19/105 |
| 2018/0027259 A1* | 1/2018 | Bravo Perez | ........ | H04N 19/132 375/240.02 |
| 2018/0063549 A1* | 3/2018 | Amer | ..................... | H04N 19/59 |

* cited by examiner

*Primary Examiner* — Rebecca A Volentine
(74) *Attorney, Agent, or Firm* — Knobbe, Martens, Olson & Bear, LLP

(57) ABSTRACT

A video packaging and origination service can include one or more encoder components that receive content for encoding and transmitting to requesting entities. Responsive to a request for content, an encoder can determine an initial set of parameters based on network measurements, including buffer size, bitrate and output resolution. Once the updated encoder component is instantiated and configured, the encoder can monitor performance and dynamically modify keyframe interval and framerate parameters to allow for streaming in lower bandwidth networks.

18 Claims, 7 Drawing Sheets

MANAGING ENCODING BASED ON PERFORMANCE

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers are generally motivated to provide requested content to client computing devices often with consideration of image quality of the requested content as reconstructed at the client computing device. Artifacts resulting from the encoding process can lead to degradation of content image when it is reconstructed at the client computing device.

Some content providers attempt to facilitate the delivery of requested content through the utilization of a content delivery network ("CDN") service provider. As with content providers, CDN service providers are also generally motivated to provide requested content to client computing devices often with consideration of image quality of the requested content to the client computing device. Accordingly, CDN service providers often consider image quality to generally improve the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
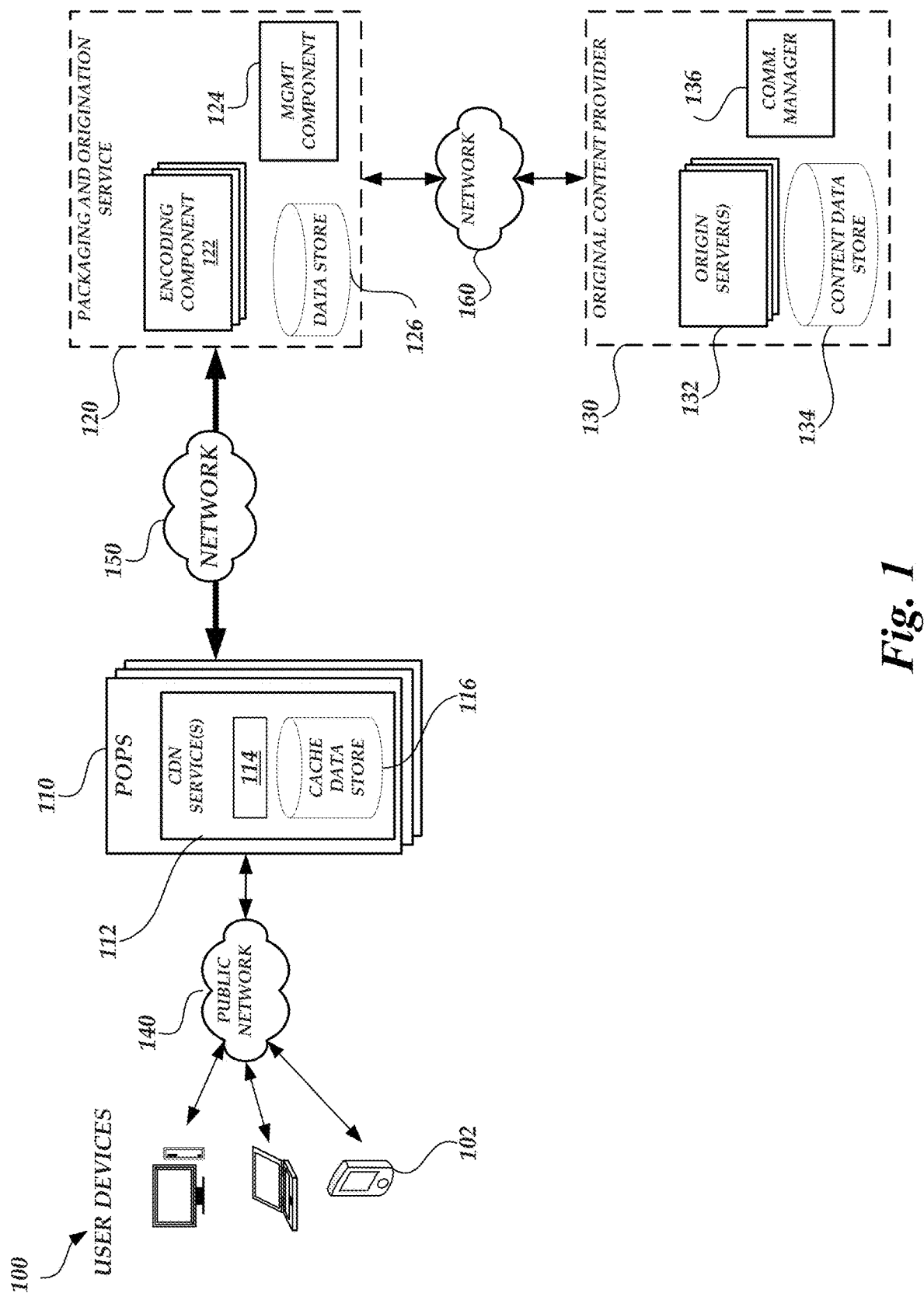
FIG. 1 is a block diagram of a communication management environment that includes one or more client devices, one or more edge locations, and a video packaging system in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream.

Each video segment can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 306 kilobits per second).

In some basic implementations, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like.

In some encoding formats, such as H.264, the encoded content stream corresponds to a set of frame of data that includes a set of keyframes or i-frames. Each individual keyframe or i-frame represents a full picture of the content and are included in spaced apart intervals in an encoded content stream. In between each keyframe, the encoded content stream includes differential or predicted frames that only include a small fragment of the keyframe and represent the differential in the sequential set of images from the original content to be encoded. Generally described, one parameter related to encoding content is generally referred to as keyframe interval and corresponds to the frequency in which keyframes are included in encoded content and correspondingly, the number of differential or partial frames in between each keyframe. Another parameter related to encoding content is generally referred to as framerate and corresponds to the total number of frames (keyframes and differential frames) transmitted in a defined period of time. In one example, content encoded with a higher keyframe interval may correspond to a higher visual quality by having more full picture frames, but would also correspond to more data. In another example, content encoded with a lower framerate may correspond to a lower visual quality because there would be less frames of data, but would also correspond to less data.

In other embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, each client computing devices, through a respective software application, can request individual video segments according to the available encoded bitrates and formats as published in the manifest file.

By way of illustrative example, a client computing device may request the first video segment at a lower or default bitrate or at the lowest available bitrate. For ease of discussion, the encoding format may also be requested with the encoding bitrate or the encoding format may be pre-defined. With continued reference to the illustrative example, if the requested segments are received and the software application determines that a download speed exceeds the requested bitrate of the received segment, the next requested segment can be requested at a higher bitrate. The process can continue until the software application reaches a maximum bitrate (e.g., due to financial considerations or other controls) or until the requested bitrate matches the available download bandwidth. Still further, if during the transmission of the video file, the bandwidth conditions change, the software application can request a different encoding bitrate based on the changed conditions.

While adaptive bit rate streaming implementations facilitate streaming content delivery experiencing variable bandwidth scenarios, such implementations typically are based on communication network infrastructure that have available bandwidth for transmitting encoded content streams. In some scenarios, such as communication network infrastructure based at least in part on wireless networks, the available bandwidth can typically fall below thresholds that correspond to acceptable bandwidth for viewing streaming content. For example, under traditional encoding approaches, content encoded below 2.5 mbps can be considered to be of insufficient video quality. However, many traditional implementations of variable bit rate encoding in limited bandwidth communication can average less than 1.5 mbps.

Aspects of the present application correspond to a content streaming system and methodology for managing encoder components. More specifically, in an illustrative embodiment, a video packaging and origination service can include one or more encoder components that receive content for encoding and transmit encoded content streams to requesting entities. Illustratively, the content can be provided by an original content provider, which configures the video packaging and origination service to encode one or more content streams in response to requests for the content streams. Individual encoder components receive or access content, encode the content according to one or more encoding profiles defined by an encoding bitrate and format, and make the encoded content streams available for transmission.

During the operation of the encoder components or responsive to a request for encoded content streams, individual encoders or a management service associated with the video packaging and origination service can receive information related to network measurements, such as output bandwidth and upload speed. Responsive to the network measurement information, the encoder components or management service can determine and configure initial encoder components parameters based on the network measurement information. In one embodiment, the encoder components or management service can utilize testing transmissions or handshaking protocols to collect the network measurement information.

Once the encoder component is instantiated and configured with the initial set of encoder parameters, the encoder component receives content for streaming, encodes content and generates encoded content streams that are transmitting to requesting entities, such as user devices or content delivery network service providers. During the transmission of the encoded content streams, the encoder or management service can detect performance information related to the transmission of the content streams. Based on the detected performance information, to improve quality, the encoder component or management service can then dynamically adjust a framerate parameter or keyframe interval utilized to encode the content. If detected performance is not acceptable, the encoder component or management service can lower the framerate parameter or increase the keyframe interval to decrease the amount of data in the encoded content stream. If the detected performance is acceptable, the encoder component or management service can increase the framerate parameter or decrease the keyframe interval to decrease the amount of data in the encoded content stream. The encoder component or management service can continuously monitor the encoded content streams and dynamically adjust the keyframe interval or framerate parameter throughout the content stream transmission. By facilitating the modification of encoding parameters, aspects of the present application facilitate content encoding for communication networks traditional not able to support content streaming or quality content streaming.

FIG. 1 illustrates a general content delivery environment 100 for delivering content from original content providers to user devices. The content delivery environment 100 includes a plurality of devices 102 utilized by individual users, generally referred to as client computing devices, to request streaming content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. Illustrative components of a client computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more information processing components 114 for processing information provided by client computing devices 102 and for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, satellite network, cellular telephone network, or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number of networks. For purposes of the present application, network 140 can be considered to have more limited bandwidth that may limit the delivery of content streams in accordance with traditional encoding approaches.

The original content providers 130 may include one or more servers 132 for delivering content, a data store 134 for maintaining content and a communication manager 136 for facilitating communications to the video packaging and origination service 120 over network°160.

In accordance with embodiments, the video packaging and origination service 120 includes a set of encoding components 122 for receiving content provided by the original content providers 130 (or other source) and processing the content to generate a set of encoded video segments available for delivery. The video packaging and origination service 120 can further include a data store 126 for maintaining collected network information or configuration changes information. The video packaging and origination service 120 is further associated with a management component 124 to facilitate in some embodiments the determination of initial encoder component parameters and to dynamically determine encoder parameters. The management component 124 can delegate at least some portion of the identified functionality to the encoder components themselves or otherwise be omitted.

It will be appreciated by those skilled in the art that the video packaging and origination service 120 and information processing component 114 may have fewer or greater components than are illustrated in FIG. 1. Thus, the depiction of the video packaging and origination service 120 and the information processing component 114 in FIG. 1 should be taken as illustrative. For example, in some embodiments, components of the video packaging and origination service 120 and the processing component 114 may be executed by one more virtual machines implemented in a hosted computing environment. A hosted computing environment may include one or more rapidly provisioned and released computing resources, which computing resources may include computing, networking or storage devices.

Figure 2:
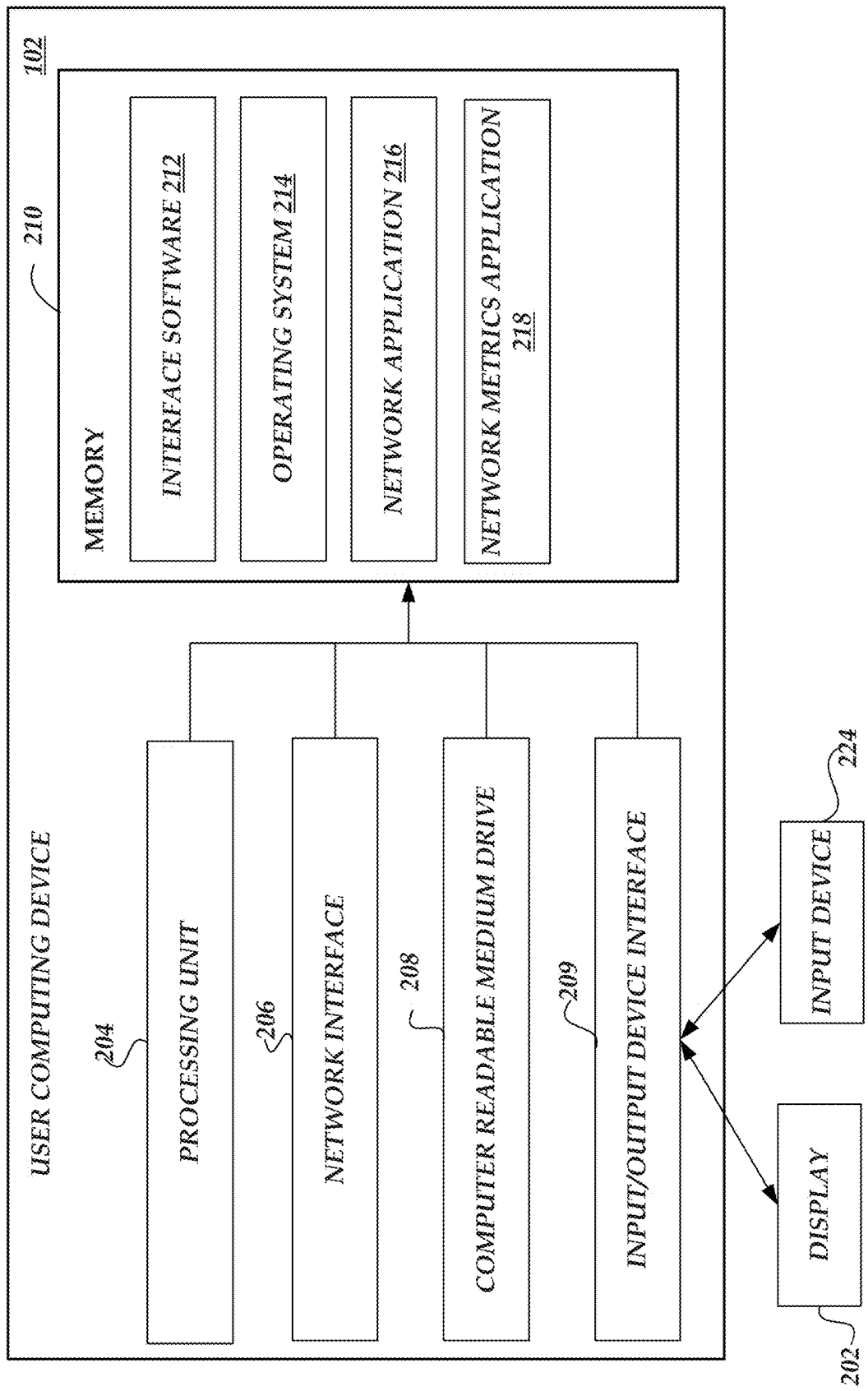
FIG. 2 is a block diagram of illustrative components of a client computing device configured to remotely process content in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive 208, an input/output device interface 209, an optional display 202, and an input device 224, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the video packaging and origination service 120 via the CDN service provider 110. For example, in one embodiment, the memory 210 includes a network application 216, such as browser application or media player, for accessing content, decoding the encoded content, and communicating with the CDN service provider 110. Still further, in other embodiments, the memory 210 can include a network metrics application 218 that can be utilized to collect performance information utilized by the encoder components 122 to configure encoder parameters as described below. In other embodiments, the network metrics application 218 may be omitted in all or a portion of the user devices 102.

Figure 3:
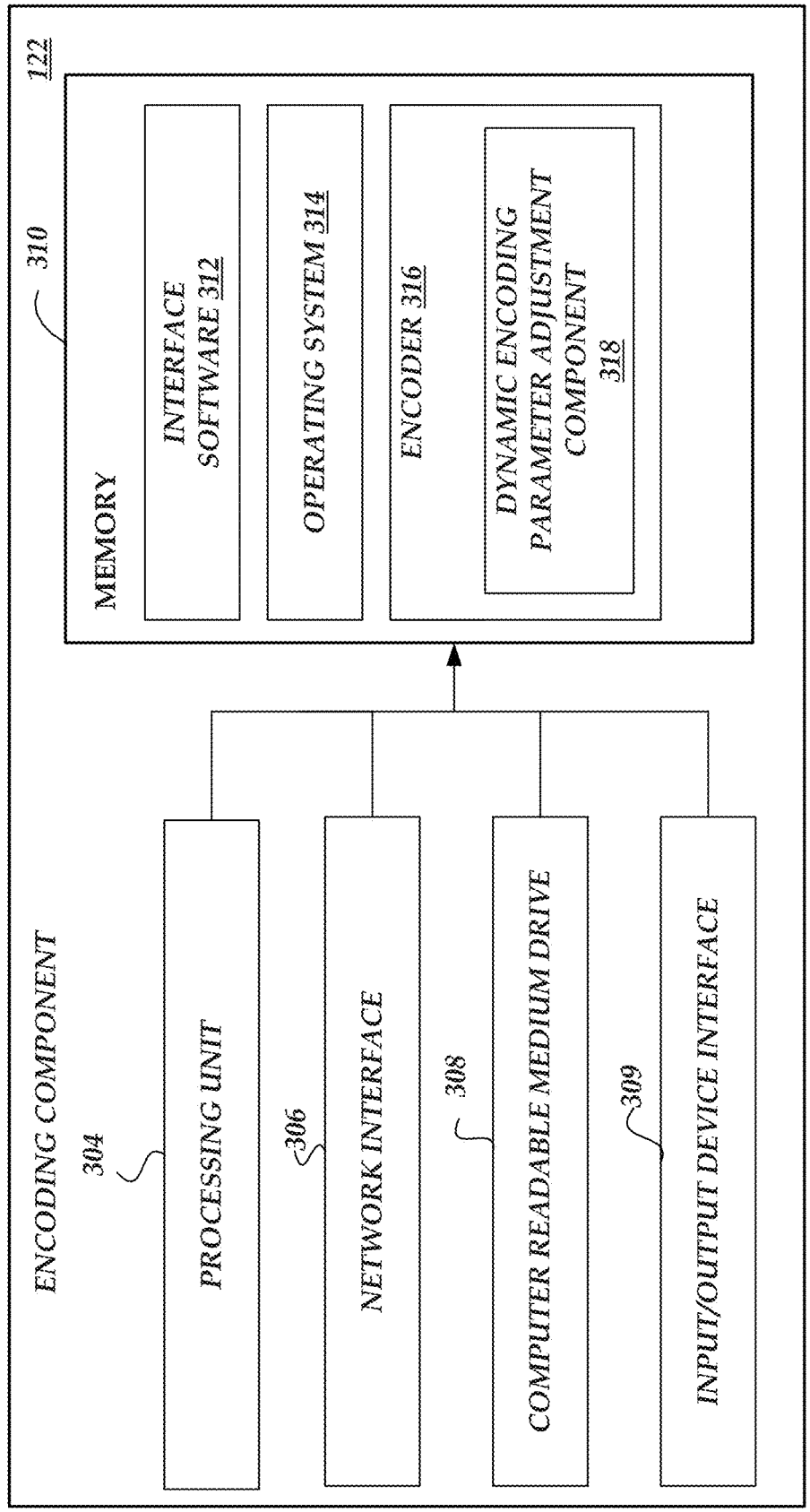
FIG. 3 is a block diagram of illustrative components of an encoder of a packaging and origination service configured to manage dynamic encoder parameters based on network measurements and content delivery performance in accordance with some embodiments.

FIG. 3 depicts one embodiment of an architecture of an illustrative encoding component 122 for implementing the video packaging and origination service 120 described herein. The general architecture of the encoding component 122 depicted in FIG. 3 includes an arrangement of computer hardware and software components that may be used to implement aspects of the present disclosure. As illustrated, the encoding component 122 of the video packaging and origination service 120 includes a processing unit 304, a network interface 306, a computer readable medium drive 308, an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. Memory 310 includes an encoder 316 for encoding video segments to be sent to user devices 102 in response to content requests.

As will be described in detail below, the encoder 316 includes a dynamic encoding parameter adjustment component 318 for managing the setting and adjusting of encoding parameters for the encoder 122. Illustratively, the dynamic encoding parameter adjustment component 318 can be utilized to determine an initial set of encoding parameters based on measured network information, such as output bandwidth and upload speed. The dynamic encoding parameter adjustment component 318 can review network data to generate the measured network information or receive at least some portion of the measured network information from other components. Additionally, the dynamic encoding parameter adjustment component 318 can also be utilized to measure performance during the transmission of encoding content streams and dynamically adjust encoding parameters such as keyframe intervals or framerate as discussed below. Similarly, the dynamic encoding parameter adjustment component 318 can review network data to generate the performance information or receive at least some portion of the performance information from other components.

As specified above, in one embodiment, the encoder components 122 illustrated in FIG. 3 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Figure 4A:
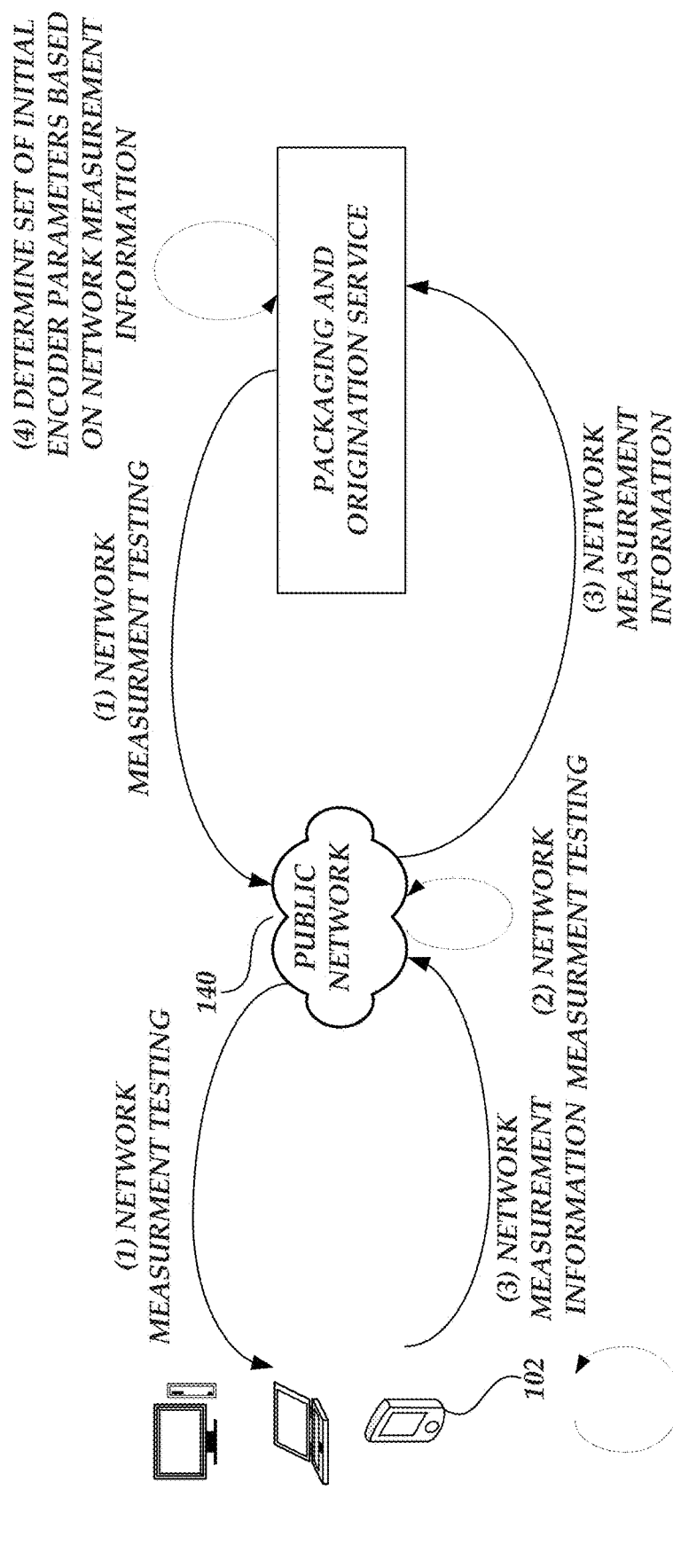
FIGS. 4A-4B are block diagrams of the content delivery environment of FIG. 1 illustrating the interaction in modifying encoder parameters in accordance with some embodiments.
Figure 4B:
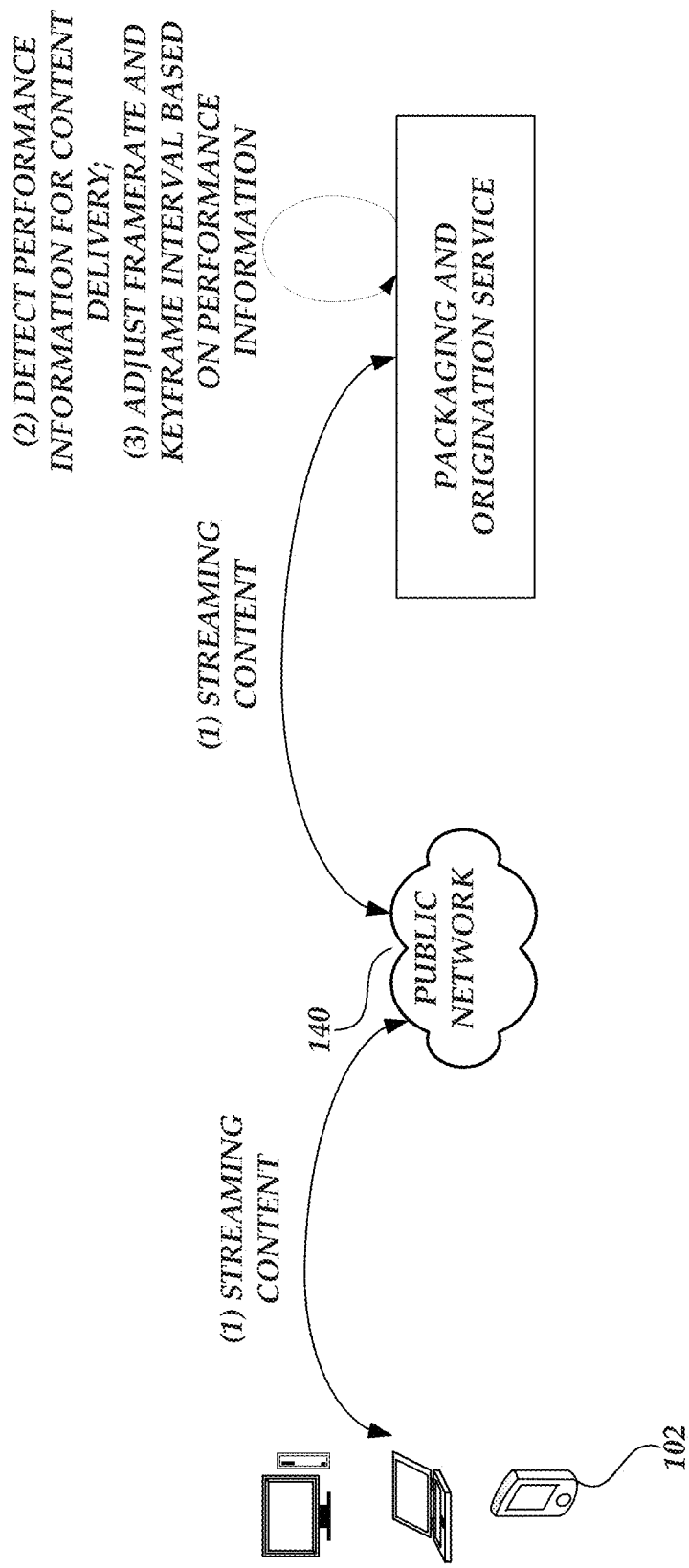

Turning now to FIGS. 4A-4B, an illustrative interaction for the setting and updating of parameters for encoder components 122 will be described. For purposes of illustration, FIGS. 4A-4B illustrate interaction between the components of the video packaging and origination service 120 and user devices 102. Such interaction is representative in nature and could include a number of additional components or interactions. Additionally, although logically represented as components within the video packaging and origination service 120, one skilled in the relevant art will appreciate that implementation of the components can be accomplished in many ways. The interaction of FIGS. 4A-4B illustratively occur after the video packaging and origination service 120 has received a requesting entity request for streaming content and an original content provider 130 has provided the requested content to the video packaging and origination service 120 for encoding.

For purposes of illustration, the content request from the user device 102 can be accomplished via access to one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110. For purposes of illustration, the receiving POP 110 may not have a copy of the requested file and may need to retrieve at least a portion of the requested content.

Additionally, the original content provider 130 transmits the streaming content in a number of ways from the original content provider 130 to the video packaging and orientation service 120. At the video packaging and orientation service 120, an ingress component or other processing component can decode incoming content and make it available for encoding and transmission to the user device 102.

With reference to FIG. 4A, the video packaging and orientation service 120 can begin a response to a request for content by determining an initial set of parameters for the encoder components 122 that will generate the streaming content. In one embodiment, the initial set of encoder parameters can include output resolution, video frame buffer size and audio or video bitrates. Additionally, as will be described, the encoder component 122 (or management service 124) can utilize measured network information to automatically set such parameters. At (1), the video packaging and orientation service 120 transmits network measurement information. In one embodiment, the video packaging and orientation service 120 can utilize the exchange of handshaking information in accordance with authentication or security protocols to determine network information such as bandwidth and upload speed. In another embodiment, the video packaging and orientation service 120 can transmit specific frames of data that will be used to conduct network measurements.

As illustrated in FIG. 4A, the network measurement information can be processed within various components of the network 140, such as routers, etc. Additionally, in other embodiments, the network measurement information may be transmitted to the user devices 102, which can utilize the network metric application to collect some portion of the requested information. In other embodiments, both forms of collection may be utilized. At (3), the requested network measurement information is transmitted to the video packaging and orientation service 120. In other embodiments, the video packaging and orientation service 120 may be able to conduct the measurement of network information without receiving metric or other information from the network 140 or user devices 102.

At (4), the video packaging and orientation service 120 via the encoder component 122 or management component 124 determines an initial set of encoder parameters based on the network metric information. In one embodiment, the video packaging and orientation service 120 can determine output resolution utilizing a bandwidth matrix. In this embodiment, a set of possible output resolution values can be associated with different bandwidth or bandwidth ranges and arranged in a matrix form. Accordingly, an output resolution can be selected based upon evaluating a measured or determined bandwidth against the bandwidth matrix. In another embodiment, the video packaging and orientation service 120 can determine video frame buffer size based on output bandwidth. In this embodiment, the encoder component 122 would not set the buffer size to be equal to the initial bitrate, but would set the buffer size to be equal to some multiple of the bandwidth. In still a further embodiment, the video packaging and orientation service 120 can set video and audio bitrates for encoding as a product of a measure upload speed or a maximum upload speed. In this embodiment, rather than a fixed bitrate setting, the video packaging and orientation service 120 would multiply the upload speed with a value less than one as the initial bitrate. This would ensure that the initial bitrate would be able to be accommodated by the network 140.

Turning now to FIG. 4B, after the instantiation or configuration of the encoder component 122 with the determined initial encoding parameters, the encoder component(s) will begin processing original content and generating encoded data streams. Illustratively, the encoder component 122 encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like.

At (1), the video packaging and orientation service 120 generates content streams as a transmission of encoded content segments. Throughout the transmission process, at (2), the video packaging and orientation service 120 collects, measures or receives performance information. In one embodiment, the performance information can include CPU utilization by the encoder. In another embodiment, the performance information can include error rates, latency measurements, packet throughput measurement. In still other embodiments, performance information can include an analysis of data frame to determine picture quality or loss. In still further embodiment, performance information can include input from user devices 102 or other components regarding network information (e.g., latency), objective quality comparisons or subjective quality comparisons.

At (3), the video packaging and orientation service 120 adjusts at least one of keyframe intervals or framerate based on the determined performance information. In one embodiment, the keyframe interval can be adjusted in accordance with the product of the CPU utilization and current bitrate. For example, the keyframe interval will be widened to reduce the amount of data. In another embodiment, the keyframe interval can be adjusted according to fixed number of frames, multiple of frames or exponentially. The adjustment of the keyframe interval can be both positive and negative such that improved performance can cause the keyframe interval to be reduced. In another embodiment, the framerate can be adjusted based on the performance. For example, the framerate can be adjusted according to fixed number of frames per time, multiple of frames per time or exponentially per time. The determination of the fixed number of frames that are adjusted may be configured by the original content provider 130, video packaging and orientation service 120 or user device 102. The adjustment of the framerate can be both positive and negative such that improved performance can cause the framerate interval to be increased. The video packaging and orientation service 120 will illustratively adjust both the keyframe interval and framerate interval but can do so independently such that each adjustment will vary. In embodiments in which the performance information corresponds to a characterization of quality or performance, the video packaging and orientation service 120 can utilize a chart or matrix to associate values to the characterizations. Illustratively, the interaction of FIG. 4B can continue throughout the transmission of encoded content in which the video packaging and orientation service 120 continuously collects performance data and dynamically updates the encoder component parameters.

Figure 5:
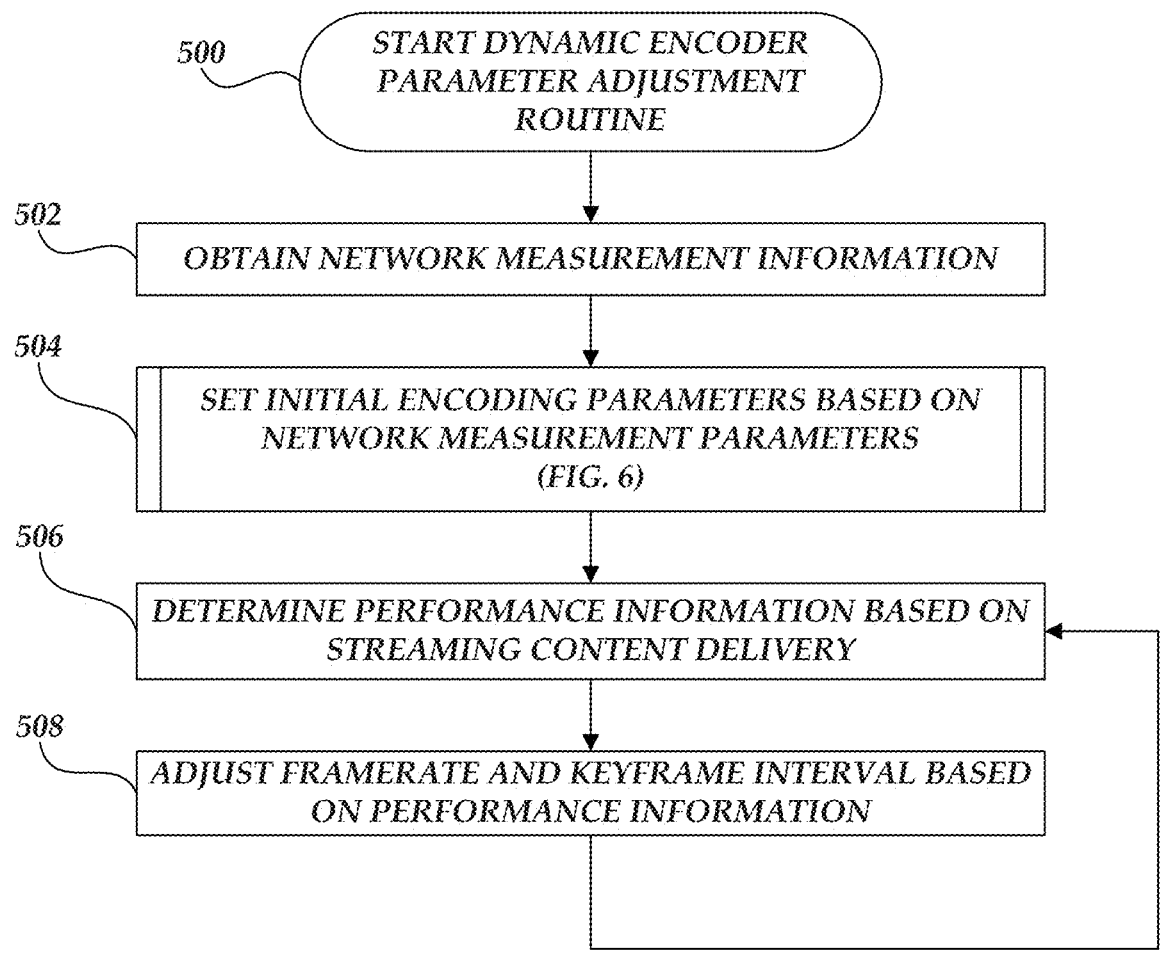
FIG. 5 is a flow diagram illustrative of a dynamic encoder parameter adjustment routine implemented by a video packaging and origination system in accordance with some embodiments.

Turning now to FIG. 5, a routine 500 for processing dynamic encoder parameter adjustments will be described. Illustratively, routine 500 will be described with regard to implementation by the video packaging and origination service 120 through the encoder component 122 or management component 124. Routine 500 illustratively occurs after the video packaging and origination service 120 has received a requesting entity request for streaming content and an original content provider 130 has provided the requested content to the video packaging and origination service 120 for encoding.

At block 502, the video packaging and orientation service 120 obtains network measurement information. In one embodiment, the video packaging and orientation service 120 can utilize the exchange of handshaking information in accordance with authentication or security protocols to determine network information such as bandwidth and upload speed. In another embodiment, the video packaging and orientation service 120 can transmit specific frames of data that will be used to conduct network measurements. In other embodiments, the network measurement information may be transmitted to the user devices 102, which can utilize the network metric application to collect some portion of the requested information. In other embodiments, both forms of collection may be utilized. In still further embodiments, the video packaging and orientation service 120 may be able to conduct the measurement of network information without receiving metric or other information from the network 140 or user devices 102.

At block 504 the video packaging and orientation service 120 via the encoder component 122 or management component 124 determines an initial set of encoder parameters based on the network metric information. An illustrative sub-routine 600 for setting the initial encoding parameters according to network measurement information will be described below.

As described above, after the instantiation or configuration of the encoder component 122 with the determined initial encoding parameters, the encoder component(s) will begin processing original content and generating encoded data streams. Illustratively, the encoder component 122 encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like.

At block 506, throughout the transmission process, the video packaging and orientation service 120 collects, measures or receives performance information. In one embodiment, the performance information can include CPU utilization by the encoder. In another embodiment, the performance information can include error rates, latency measurements, packet throughput measurement. In still other embodiments, performance information can include an analysis of data frame to determine picture quality or loss. In still further embodiment, performance information can include input from user devices 102 or other components regarding network information (e.g., latency), objective quality comparisons or subjective quality comparisons.

At block 508 the video packaging and orientation service 120 adjusts at least one of keyframe intervals or framerate based on the determined performance information. In one embodiment, the keyframe interval can be adjusted in accordance with the product of the CPU utilization and current bitrate. For example, the keyframe interval will be widened to reduce the amount of data. In another embodiment, the keyframe interval can be adjusted according to fixed number of frames, multiple of frames or exponentially. The adjustment of the keyframe interval can be both positive and negative such that improved performance can cause the keyframe interval to be reduced. In another embodiment, the framerate can be adjusted based on the performance. For example, the framerate can be adjusted according to fixed number of frames per time, multiple of frames per time or exponentially per time. The determination of the fixed number of frames that are adjusted may be configured by the original content provider 130, video packaging and orientation service 120 or user device 102. The adjustment of the framerate can be both positive and negative such that improved performance can cause the framerate interval to be increased. The video packaging and orientation service 120 will illustratively adjust both the keyframe interval and framerate interval but can do so independently such that each adjustment will vary. In embodiments in which the performance information corresponds to a characterization of quality or performance, the video packaging and orientation service 120 can utilize a chart or matrix to associate values to the characterizations. As illustrated in FIG. 5, routine 500 continues throughout the transmission of encoded content in which the video packaging and orientation service 120 continuously collects performance data and dynamically updates the encoder component parameters by repeating blocks 506 and 508.

Figure 6:
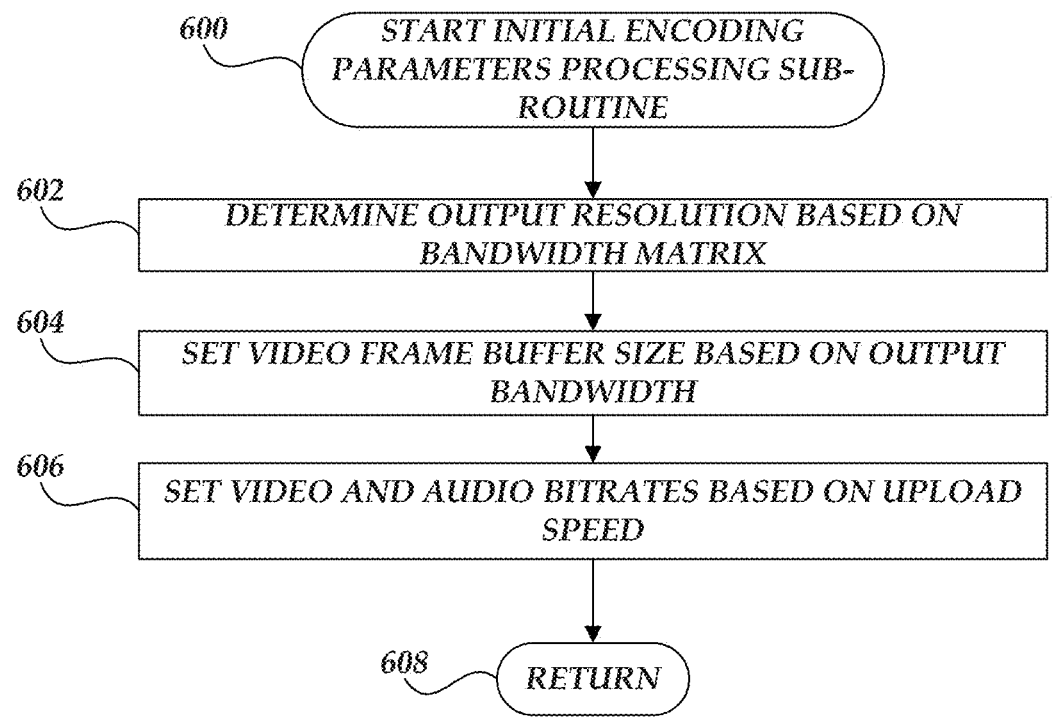
FIG. 6 is a flow diagram illustrative of an initial encoder parameters processing sub-routine implemented by an encoder in accordance with some embodiments.

Turning now to FIG. 6, a sub-routine 600 for setting initial encoder parameters based on network information will be described. Illustratively, routine 500 will be described with regard to implementation by the video packaging and origination service 120 through the encoder component 122 or management component 124. Sub-routine 600 can be implemented as part of block 504 of routine 500 (FIG. 5). At block 602, the video packaging and orientation service 120 can determine output resolution utilizing a bandwidth matrix. In one embodiment, a set of possible output resolution values can be associated with different bandwidth or bandwidth ranges and arranged in a matrix form. Accordingly, an output resolution can be selected based upon evaluating a measured or determined bandwidth against the bandwidth matrix.

At block 604, the video packaging and orientation service 120 can determine video frame buffer size based on output bandwidth. In this embodiment, the encoder component 122 would not set the buffer size to be equal to the initial bitrate, but would set the buffer size to be equal to some multiple of the bandwidth.

At block 606, the video packaging and orientation service 120 can set video and audio bitrates for encoding as a product of a measure upload speed or a maximum upload speed. In this embodiment, rather than a fixed bitrate setting, the video packaging and orientation service 120 would multiply the upload speed with a value less than one as the initial bitrate. This would ensure that the initial bitrate would be able to be accommodated by the network 140. At block 608, sub-routine 600 returns.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for encoding content comprising:
one or more computing devices associated with a content management system, wherein the content management system is configured to:
  receive a content stream from a content provider; and
  receive a request for content to be encoded according an encoding profile from a requesting entity; and
one or more computing devices associated with a video encoder component, wherein the video encoder component is configured to:
  obtain network measurement information corresponding to one or more aspects of a communication network;
  set initial encoding parameters based on the network measurement information;
  encode the content to be encoded to form encoded content streams based in accordance with the initial encoding parameters;
  transmit the encoded content streams;

determine encoder processor utilization of an encoder of the video encoder component; and adjust a keyframe interval based on a product of the encoder processor utilization and current bitrate.

2. The system of claim 1, wherein setting the initial encoding parameters based on the network measurement information includes determining an output resolution based on a bandwidth matrix.

3. The system of claim 1, wherein setting the initial encoding parameters based on the network measurement information includes setting a video frame buffer size based on output bandwidth.

4. The system of claim 1, wherein setting the initial encoding parameters based on the network measurement information includes setting an encoding bitrate based on upload speed.

5. A computer-implemented method for managing encoder components comprising:

receiving a content stream corresponding to content to be encoded;

receiving a request for content to be encoded according an encoding profile from a requesting entity;

generating, with an encoder, encoded output based on the requested content and in accordance with initial encoding parameters;

determining encoder processor utilization of the encoder; and adjusting a keyframe interval based on a product of the encoder processor utilization and current bitrate.

6. The computer-implemented method of claim 5 further comprising adjusting a framerate based on performance information that is based on transmitting the encoded output, wherein adjusting the framerate includes decreasing the framerate based on fixed amounts.

7. The computer-implemented method of claim 6, wherein adjusting the framerate further includes increasing the framerate based on the fixed amounts.

8. The computer-implemented method of claim 6, wherein adjusting the framerate further includes increasing the framerate based on different fixed amounts.

9. The computer-implemented method of claim 5 further comprising:

obtaining network measurement information corresponding to one or more aspects of a communication network; and setting initial encoding parameters based on the network measurement information.

10. The computer-implemented method of claim 9, wherein setting the initial encoding parameters based on the network measurement information includes setting a video frame buffer size based on output bandwidth.

11. The computer-implemented method of claim 9, wherein setting the initial encoding parameters based on the network measurement information includes setting an encoding bitrate based on upload speed.

12. The computer-implemented method of claim 9, wherein setting the initial encoding parameters based on the network measurement information includes determining an output resolution based on a bandwidth matrix, the bandwidth matrix defining one or more output resolution values for different network bandwidths.

13. The computer-implemented method of claim 5 further comprising adjusting a framerate based on the performance information that is based on transmitting the encoded output.

14. The computer-implemented method of claim 5,
wherein adjusting the keyframe interval includes dynamically adjusting the keyframe interval based on a continuous monitoring of the encoder processor utilization.

15. A computer-implemented method for delivering content comprising:

establishing one or more initial encoding parameters of an encoder based on network measurement information corresponding to one or more aspects of a communication network;

wherein the encoder encodes content requested by a requesting entity according to an encoding profile incorporating the one or more initial encoding parameters to form encoded content streams; and adjusting a keyframe interval associated with the encoded content streams based on a product of encoder processor utilization and current bitrate.

16. The computer-implemented method of claim 15, wherein setting the initial encoding parameters based on the network measurement information includes at least one of setting a video frame buffer size, setting an encoding bitrate or determining an output resolution.

17. The computer-implemented method of claim 15 further comprising adjusting a framerate based on performance information associated with a transmission of encoded content streams.

18. The computer-implemented method of claim 15,
wherein adjusting the keyframe interval includes dynamically adjusting the keyframe interval based on a continuous monitoring of the encoder processor utilization.

* * * * *